(12) United States Patent
Adkins

(10) Patent No.: US 8,707,816 B2
(45) Date of Patent: Apr. 29, 2014

(54) RIGHT ANGLE DRIVE WITH CENTER SUPPORT

(75) Inventor: Edward D. Adkins, Machesney Park, IL (US)

(73) Assignee: Nomis LLC, Palatine, IL (US)

( * ) Notice: Subject to any disclaimer, the term of this patent is extended or adjusted under 35 U.S.C. 154(b) by 273 days.

(21) Appl. No.: 13/165,856

(22) Filed: Jun. 22, 2011

(65) Prior Publication Data

US 2012/0024096 A1 Feb. 2, 2012

Related U.S. Application Data

(60) Provisional application No. 61/368,821, filed on Jul. 29, 2010.

(51) Int. Cl.
 *F16H 1/12* (2006.01)
(52) U.S. Cl.
 USPC .............................................. 74/416; 74/417
(58) Field of Classification Search
 USPC ......... 74/63, 412 R, 416, 417, 423; 81/57.13, 81/57.26, 57.29; 384/252, 257, 428, 438, 384/439, 440
 See application file for complete search history.

(56) References Cited

U.S. PATENT DOCUMENTS

| | | | | |
|---|---|---|---|---|
| 2,906,567 A * | 9/1959 | Runton et al. | ............. | 384/191.2 |
| 3,333,481 A * | 8/1967 | Kulig | .............................. | 74/417 |
| 4,321,838 A * | 3/1982 | Feldman | ......................... | 74/417 |
| 4,685,848 A * | 8/1987 | Langer | ........................... | 411/402 |
| 4,751,970 A * | 6/1988 | Hecker et al. | ................. | 173/104 |
| 5,363,723 A * | 11/1994 | Hoffman | ...................... | 74/606 R |
| 5,788,903 A * | 8/1998 | Allgaier | ......................... | 264/219 |
| 6,009,776 A * | 1/2000 | Warren | ......................... | 81/57.29 |
| 6,112,621 A * | 9/2000 | Ochiai | .......................... | 81/57.29 |
| 6,125,721 A * | 10/2000 | Yang | ............................. | 81/57.29 |
| 6,463,824 B1 * | 10/2002 | Prell et al. | ........................ | 74/417 |
| 6,820,339 B2 * | 11/2004 | Albrightson | .................... | 30/392 |
| 2008/0003070 A1 * | 1/2008 | Hor | ................. | 408/124 |
| 2011/0067513 A1 * | 3/2011 | Wilson | ............................ | 74/416 |

FOREIGN PATENT DOCUMENTS

| | | |
|---|---|---|
| EP | 1129825 A2 | 9/2001 |
| JP | 05-123915 A | 5/1993 |
| JP | 2004-261959 A | 9/2004 |

* cited by examiner

*Primary Examiner* — Troy Chambers
*Assistant Examiner* — Zakaria Elahmadi
(74) *Attorney, Agent, or Firm* — Reinhart Boerner Van Deuren P.C.

(57) ABSTRACT

A right angle drive is provided. The right angle drive includes an input shaft, an output shaft, a housing a pair of input shaft bearings and a pair of output shaft bearings. The input shaft carries an input gear for rotation about an input axis. The output shaft carries an output gear for rotation about an output axis. The input and output gears are coupled to transfer rotational motion therebetween. The input and output axis being non-parallel to one another. The pair of input shaft bearings carry the input shaft within the housing for rotation about the input axis. One bearing is on either side of the input gear. The pair of output shaft bearings carry the output shaft within the housing for rotation about the output axis. One bearing is on either side of the input gear. The bearings may interlock with one another.

19 Claims, 9 Drawing Sheets

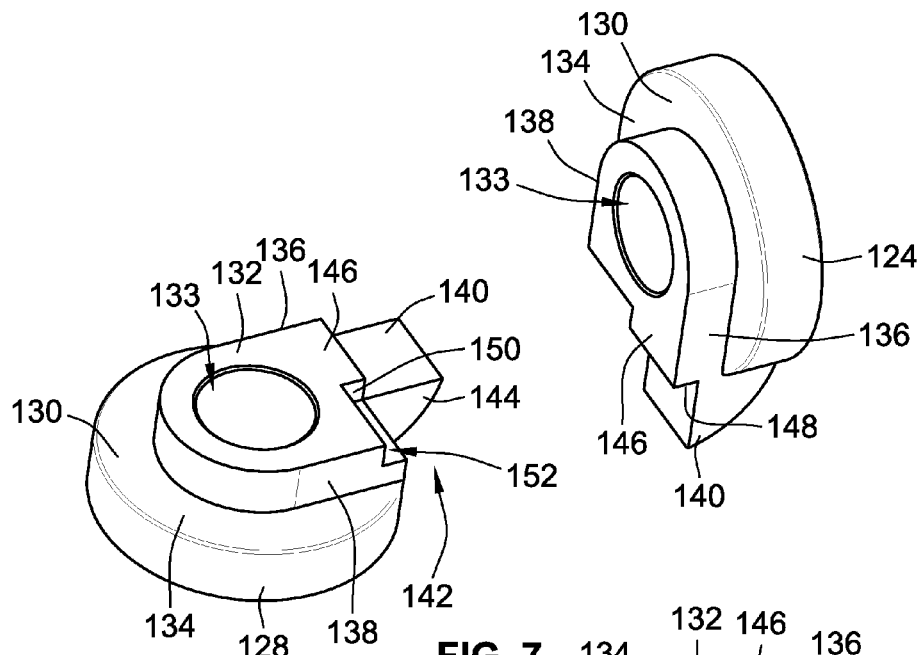
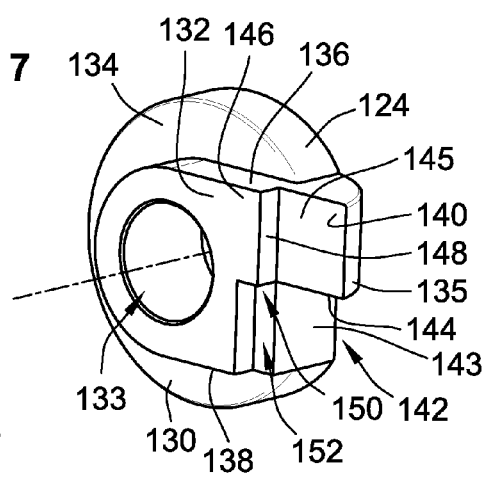
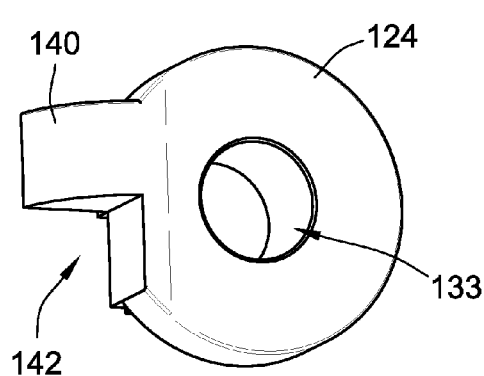
FIG. 7
FIG. 8
FIG. 9

RIGHT ANGLE DRIVE WITH CENTER SUPPORT

CROSS-REFERENCE TO RELATED PATENT APPLICATIONS

This patent application claims the benefit of U.S. Provisional Patent Application No. 61/368,821, filed Jul. 29, 2010, the entire teachings and disclosure of which are incorporated herein by reference thereto.

FIELD OF THE INVENTION

This invention generally relates to right angle drives for drilling operations, and more particularly to right angle drive attachments for converting a standard drill into a right angle drive.

BACKGROUND OF THE INVENTION

Right angle drives typically include an input shaft that is at a right angle to an output shaft. The input and output shafts are coupled by a pair of gears. As such, power supplied to the input shaft about a first axis of rotation is converted to an output about an axis of rotation for the output shaft that is at a right angle to that input axis. This allows an operator to use a drill or similar device in tight locations.

Typically, the output shaft has a standard drill chuck attached thereto. The input shaft is typically configured to be gripped by a chuck of a standard drill. However, other right angle arrangements are provided in drills where the entire drill is a right angle drill and the right angle drive is not configured as an attachment. In those situations, the input shaft may be directly coupled to a motor rather than providing a gripping portion that is configured to be securely gripped or engaged by the chuck of an independent drill.

The problem with these right angle drives is that the load on the drill is typically not directly applied along the output shaft axis. This causes side pressure and flexure in the output shaft which can cause undesirable friction on the bearing supporting the output shaft. This friction can cause heating of the housing in which the shafts are mounted, which then allows for deformation therein. This deformation can result in undesirable wobbling of the output shaft, which reduces accuracy of the device causing it to become inoperable.

One thing that increases the flexure in the shafts is that the shafts are typically only supported on the outboard side of the gears therein. Therefore, the gears are typically in a cantilevered state which allows for more flexure thereof. Further, the tight envelope in which the beveled gears are housed makes it difficult to support the inboard end of the output and input shafts such with shafts being supported on both sides of the bevel gears. This is because the free inboard ends of the shafts typically would abut one another. Further, due to the very tight quarters, any such support would be extremely small and it would be very difficult to prevent such support from rotating thereby further promoting heat generation and warping of the housing thereby furthering the problem identified above.

Therefore, there is a need in the art for a right angle drive arrangement that allows for support on both sides of the beveled gears within the right angle drive.

BRIEF SUMMARY OF THE INVENTION

In one aspect, an angle drive that supports input and output shafts thereof on both sides of the corresponding input and output gears.

In a more particularly embodiment, the support on the inboard side of the input and output shafts is provided by a pair of interlocking bushings that interlock with one another to prevent rotation and axial movement thereof.

In a further embodiment, the interlocking bushings are identical to one another to reduce mold costs.

In a particular embodiment, an angle drive comprising an input shaft, an output shaft, a housing, inboard and outboard input shaft bearings and inboard and outboard output shaft bearings is provided. The input shaft carries an input gear for rotation about an input axis. The output shaft carries an output gear for rotation about an output axis. The input and output gears are coupled to transfer rotational motion therebetween. The input axis and output axis being non-parallel to one another. The inboard and outboard input shaft bearings carry the input shaft within the housing for rotation about the input axis. The inboard input shaft bearing supports the input shaft on an inboard side of the input gear and the outboard input shaft bearing supports the input shaft on the outboard side of the input gear. The inboard and outboard output shaft bearings carry the output shaft within the housing for rotation about the output axis. The inboard output shaft bearing supports the output shaft on an inboard side of the output gear and the outboard shaft bearing supports the output shaft on the outboard side of the output gear.

In one embodiment, the inboard input shaft bearing and inboard output shaft bearing engage one another.

In another embodiment, the inboard input shaft bearing includes at least one flat surface that engages a flat of the housing to prevent rotation of the input shaft bearing relative to the housing.

In one embodiment, the inboard input shaft bearing includes a radially extending locking projection that defines an angularly facing abutment surface. The inboard output shaft bearing includes a radially extending locking projection that defines an angularly facing abutment surface. The angularly facing abutment surfaces angularly abut one another to interlock the inboard input and output shaft bearings.

In one more particular embodiment, the inboard input shaft bearing includes an aperture axially receiving the input shaft therein. The input axis is aligned with a central axis of the aperture. The angularly facing abutment surface of the inboard input shaft bearing is substantially planar defining a first reference plane. The first reference plane including the central axis of the aperture.

In one embodiment, the inboard input and output shaft bearings are identical.

In one embodiment, the inboard input shaft bearing includes a relief cavity adjacent the angularly facing abutment surface and the inboard output shaft bearing includes a relief cavity adjacent the angularly facing abutment surface. The radially extending locking projection of the inboard input shaft bearing positioned within the relief cavity of the inboard output shaft bearing and the radially extending locking projection of the inboard output shaft bearing positioned within the relief cavity of the inboard input shaft bearing.

In one embodiment, the inboard input shaft bearing includes an aperture axially receiving the input shaft therein. The input axis is aligned with a central axis of the aperture. The axially extending locking projection of the inboard input shaft bearing defines an axially facing abutment surface that is substantially orthogonal to the central axis of the aperture. The inboard output shaft bearing includes a radially facing abutment surface. The axially facing abutment surface of the inboard input shaft bearing abutting the radially facing abutment surface of the inboard output shaft bearing.

In one particular embodiment, the inboard input shaft bearing includes: an aperture axially receiving the input shaft therein, the input axis aligned with a central axis of the aperture; the radially extending locking projection of the inboard input shaft bearing defines an axially facing abutment surface that is substantially orthogonal to the central axis of the aperture; and a radially facing abutment surface. The inboard output shaft bearing includes: an aperture axially receiving the output shaft therein, the output axis aligned with a central axis of the aperture; the radially extending locking projection of the inboard output shaft bearing defines an axially facing abutment surface that is substantially orthogonal to the central axis of the aperture; and a radially facing abutment surface.

Additionally, the axially facing abutment surface of the inboard input shaft bearing abuts the radially facing abutment surface of the inboard output shaft bearing. The axially facing abutment surface of the inboard output shaft bearing abuts the radially facing abutment surface of the inboard input shaft bearing.

In one embodiment, the inboard input shaft bearing includes a main body portion and an abutment projection extending axially outward from the main body portion in a stepped relationship. The abutment projection defines at least one anti-rotation feature. The housing includes a first support wall including an anti-rotation feature that cooperates with the anti-rotation feature of the abutment projection to prevent rotation of the inboard input shaft bearing relative to the housing. The inboard input shaft bearing including an aperture axially receiving the input shaft therein. The main body portion axially abutting the first support wall in a direction extending generally along the input axis. The anti-rotation features of the abutment projection and the first support wall cooperate in a direction extending generally perpendicular to the input axis. In one embodiment, the anti-rotation features are flats.

In another embodiment, the main body portion is positioned axially between the first support wall and the input gear.

In one embodiment, the inboard input shaft bearing and the inboard output shaft bearing are bushings.

In another embodiment, the inboard input shaft bearing includes a radially extending locking projection. The inboard output shaft bearing includes a radially extending locking projection angularly engaging the radially extending locking projection of the inboard input shaft bearing.

In another embodiment the inboard input shaft bearing includes a radially extending locking projection that defines an angularly facing abutment. The inboard output shaft bearing includes a radially extending locking projection that defines an angularly facing abutment. The angularly facing abutments angularly abutting one another to interlock the inboard input and output shaft bearings.

In a more particular embodiment, the inboard input shaft bearing includes a relief cavity adjacent the angularly facing abutment and the inboard output shaft bearing includes a relief cavity adjacent the angularly facing abutment. The radially extending locking projection of the inboard input shaft bearing is positioned within the relief cavity of the inboard output shaft bearing and the radially extending locking projection of the inboard output shaft bearing is positioned within the relief cavity of the inboard input shaft bearing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 3-7 illustrate the inter connection of the interlocking bushings of the right angle drive;

FIGS. 8 and 9 are perspective illustrations of the interlocking bushings;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
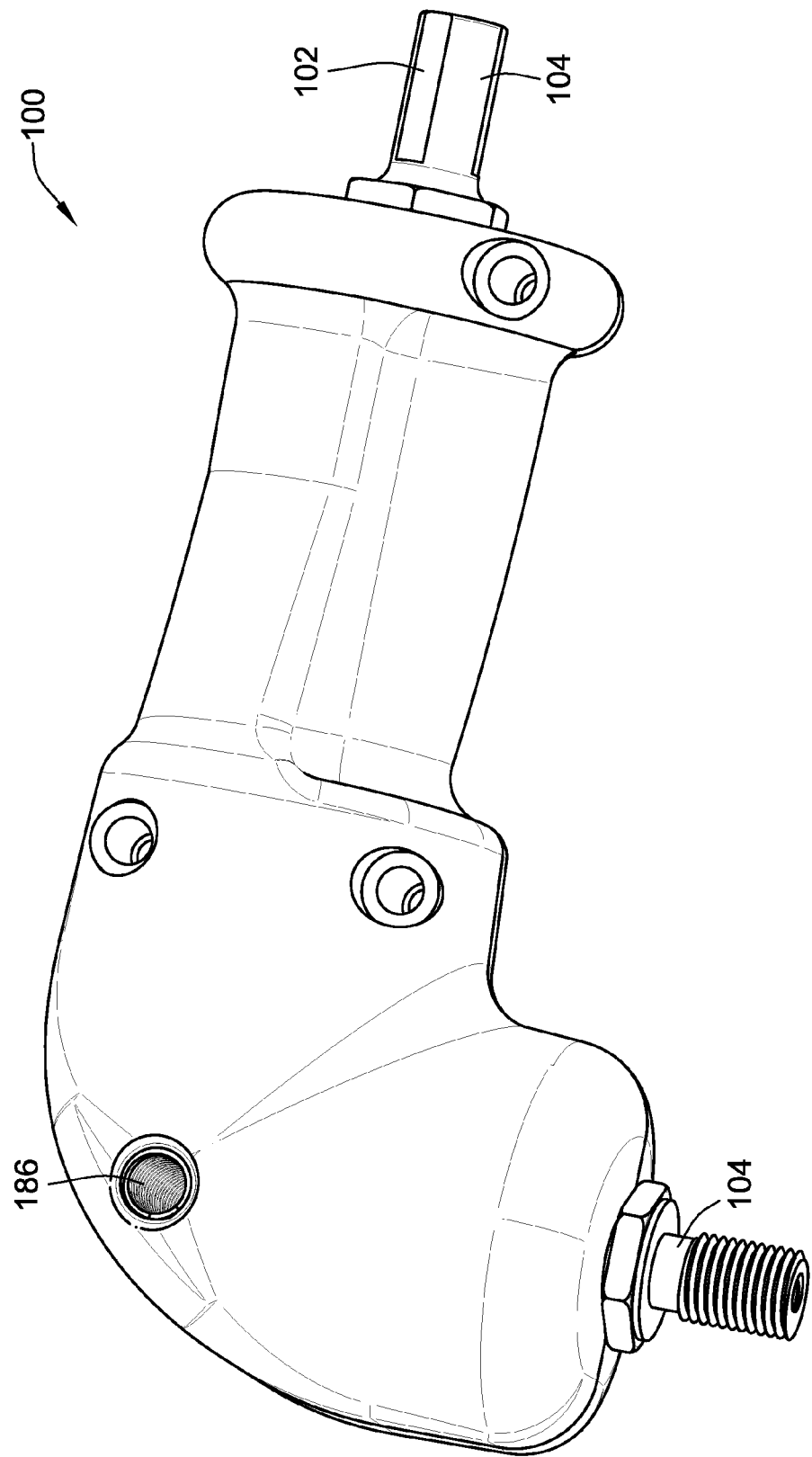
FIG. 1 is a perspective illustration of a right angle drive attachment according to an embodiment of the present invention.

FIG. 1 illustrates a right angle drive 100 that can be used to convert a rotational input about an input axis to a rotational output about an output axis. The right angle drive 100 includes an input shaft 102 operably coupled to an output shaft 104. Typically, the input and output shafts 102, 104 rotate about separate axes that extend at right angles to one another such that the rotational input can be converted to a rotational output about a different axes. In FIG. 1, a chuck can be attached to the threaded end of output shaft 104.

Figure 2:
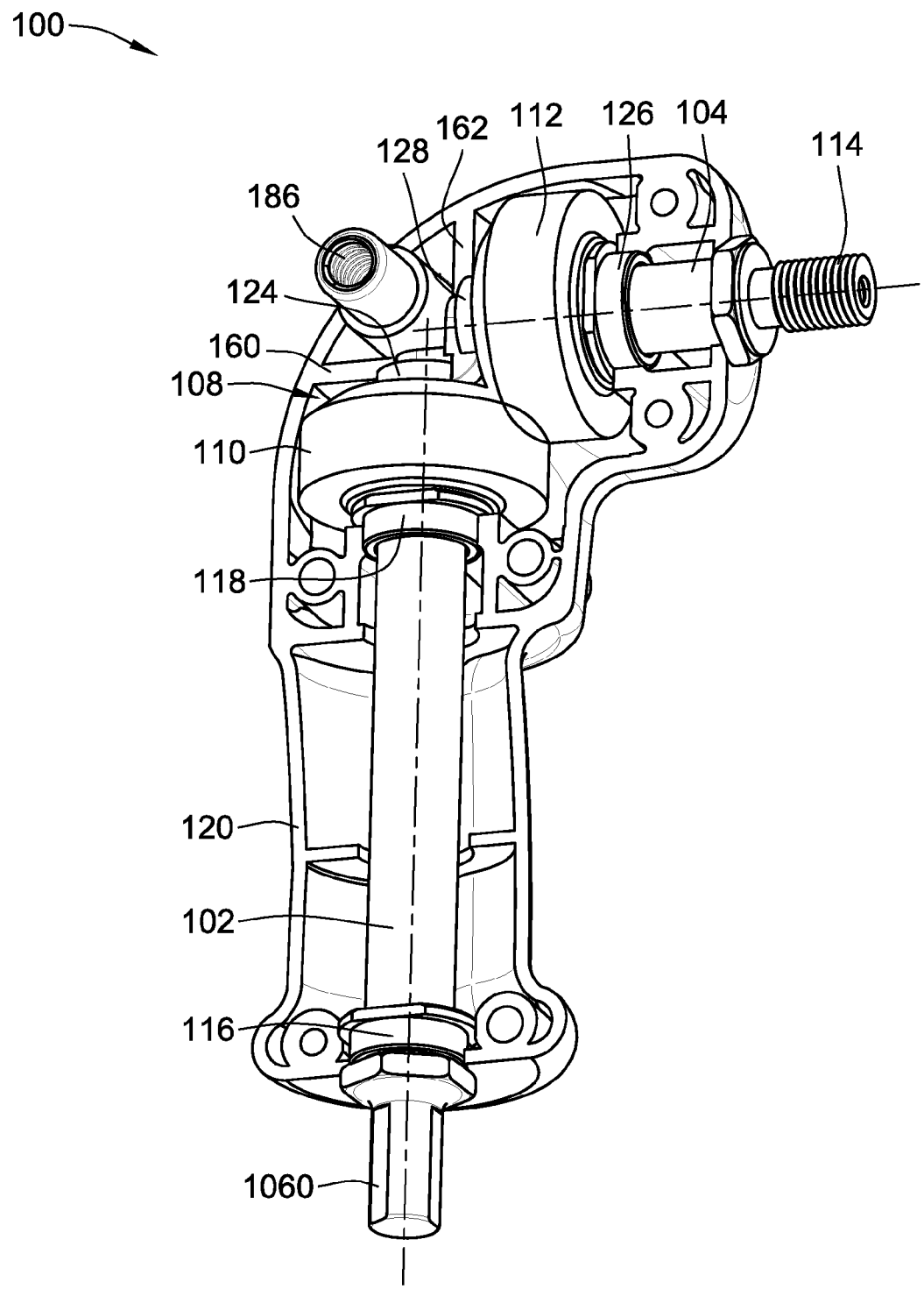
FIG. 2 is a perspective illustration of the right angle drive attachment of FIG. 1 with one of the cover pieces removed.
Figure 3:
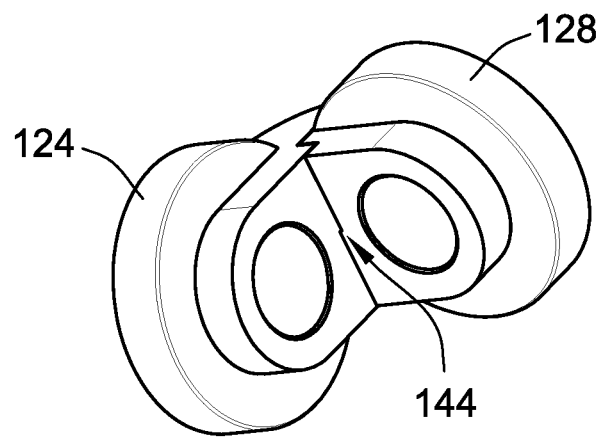
Figure 4:
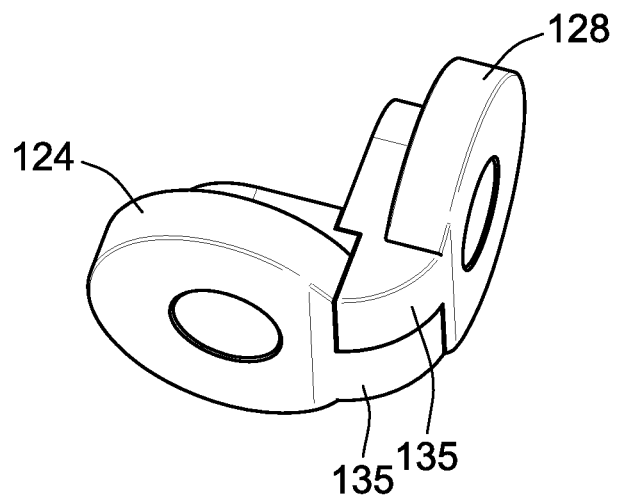
Figure 5:
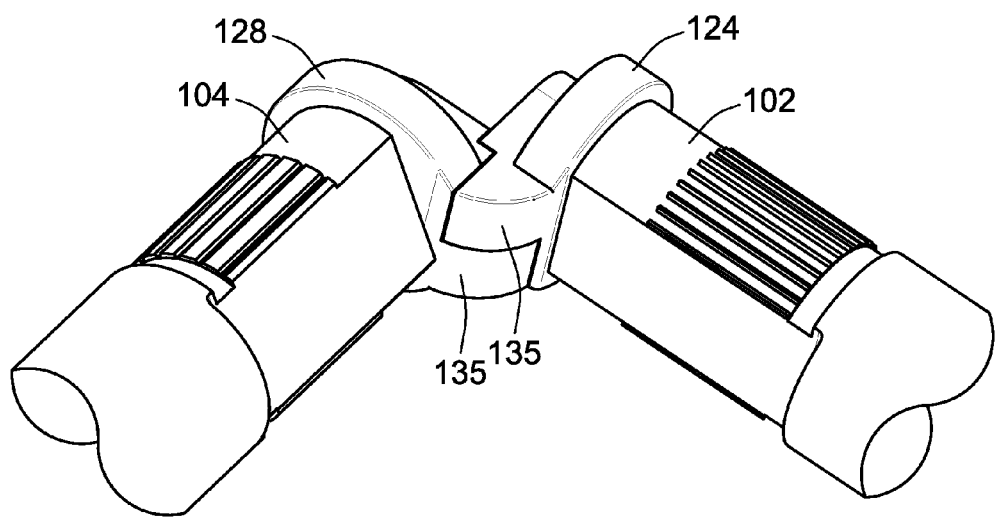
Figure 6:
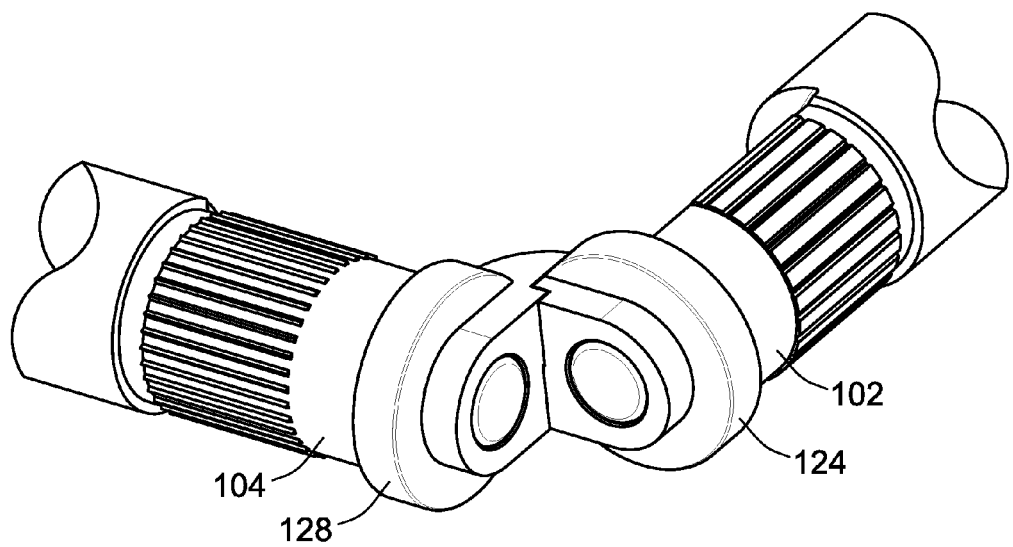

FIG. 2 illustrates the right angle drive 100 with one of the housing pieces or shells removed. This illustrates the internal components of the right angle drive.

The outboard end of the input shaft 102 has a gripping portion 106 configured to be gripped by a chuck or other coupling of an input device. Typically, this input device is a separate drill. As such, the gripping portion 106 has a plurality of flats that allow for transferring rotational movement from the input device to the input shaft 102. At an inboard end 108 of the input shaft 102 is an input gear 110 in the form of a bevel gear. The input gear 110 is operably coupled to the input shaft 102 to prevent rotation therebetween. As such, rotary motion of the input shaft 102 is directly translated to the input gear 110.

The input gear 110 operably engages a cooperating output gear 112. Rotary motion of the input gear 110 is translated to the output gear 112. The output gear 112 is operably mounted to the output shaft 104 to prevent rotation therebetween. As such, as the input gear 110 drives the output gear 112, the output gear also drives output shaft 104.

Typically, the input and output shafts 102, 104 have flats and grooves for engaging the beveled input and output gears 110, 112.

The output shaft 104 has an outboard free end 114 that, in the illustrated embodiment, is threaded for mounting a chuck (not shown). However, other embodiments could have different output ends. For instance, the threaded end could merely be a socket that is configured to receive removable bits.

The input shaft 102 is supported on the outboard side of the input gear 110 by a pair of outboard input shaft bearings in the form of bushings 116, 118. The bushings 116, 118 are mounted within the housing 120 to prevent rotation relative to housing 120. This prevents rotational friction between the bushings and the housing to reduce heat transfer generation therebetween. In other embodiments bearings such as ball bearings could be used instead of the bushings.

Typically, this is the only support that is provided in such a right angle drive. The inboard end 108 of the input shaft 102 typically would not be supported at all. However, in the illustrated embodiment, the inboard end 108 of the input shaft 102 is supported by an inboard input shaft bearing in the form of input shaft interlocking bushing 124. This interlocking bushing 124 is mounted on or proximate the free end of the inboard end of the input shaft 102 and has an aperture axially receiving the input shaft 102 with a central axis of the aperture aligned with the input axis of the input shaft 102. This arrangement provides support for the input shaft 102 on both the inboard and outboard sides of the input gear 110.

The output shaft 104 is supported by outboard output shaft bearing in the form of bushing 126. Bushing 126 is on the outboard side of the output gear 112. A second bushing could be provided on this side of the output shaft 104 for a similar arrangement as the input shaft 102. However, due to the short length of the output shaft 104, this additional bushing typically is not required.

On the inboard end of the output shaft 104 an inboard output shaft bearing in the form of output shaft interlocking bushing 128 supports this free end of the output shaft 104. The interlocking bushing 128 supports this end of the output shaft 104 for rotation. The interlocking bushing 128 includes an aperture that axially receives the output shaft with a central axis of the aperture aligned with the output axis of the output shaft 104

The interlocking bushings 124, 128 of the illustrated embodiment are identical to one another.

The interlocking bushings 124, 128 interlock with one another to prevent or assist in preventing rotation of the two bushings relative to housing 120. Further, the interlocking relationship between the two interlocking bushings 124, 128 assist in providing axial support for the individual bushings. More particularly, as interlocking bushing 124 is axially bias in a direction extending away from input gear 110, the other interlocking bushing 128 will provide axial support opposing such movement. Further, interlocking bushing 124 provides the same type of support for interlocking bushing 128.

FIGS. 3-7 illustrate the interlocking relationship between the interlocking bushings 124, 128.

With regard to FIG. 8, a single one of the interlocking bushings 124, 128 is illustrated.

The interlocking bushing 124 has a substantially circular main body portion 130. The main body portion defines a bearing support aperture 133 extending therethrough. The aperture 133 is sized to receive a free end of the input shaft 102.

Further, the main body 130 includes an abutment projection 132. The abutment projection 132 extends outward from a face 134 of the circular body portion 130 forming a stepped relationship. The abutment projection 132 includes a pair of flat surfaces 136, 138 (i.e. flats) that cooperate with similar flats in the housing 120 to prevent rotation or assist in preventing rotation of the interlocking bushing 124 relative to housing 120.

The interlocking bushing 124 further includes a radial locking projection 140 extending radially outward. The radial locking projection 140 interacts with a corresponding radial locking projection of the other interlocking bushing 128 when the right angle drive arrangement is assembled. The radial locking projection 140 and the main body 130 define a relief cavity 142 in which the radial locking projection of the other interlocking bushing 128 is received when assembled. The radial locking projection 140 and cavity 142 are angularly offset from one another about the axis defined by aperture 133. The radial locking projections 140 have curved outer surfaces 135.

The radial locking projection 140 defines an angularly facing abutment in the form of angularly facing abutment surface 144 which will be abutted, angularly, against a same abutment surface of the other interlocking bushing 128. These two engaging surfaces assist in preventing the relative rotation of the two interlocking bushings 124, 128 when assembled.

The angularly facing abutment surface 144 is angularly adjacent the relief cavity 142. In the illustrated embodiment, the angularly facing abutment surface 144 in the illustrated embodiment is substantially planar defining a reference plane that also includes the central axis defined by aperture 133.

The interlocking bushing 124 further includes a radially facing abutment in the form of radially facing abutment surface 143 that will be abutted against axially facing abutment in the form of axially facing abutment surface 145 of the radial locking projection 140 of the other interlocking bushing when assembled. The axially facing abutment surface 145 is also adjacent the relief cavity 142. The axially facing abutment surface 145 in the illustrated embodiment is substantially orthogonal to central axis of aperture 133

The abutment projection 132 also defines a separate abutment portion 146 which forms a stepped relationship with locking projection 140. This abutment 146 defines two additional abutment surfaces 148, 150. Abutment surface 148 faces radially outward while abutment surface 150 faces angularly. Further, a similar receiving cavity 152 is provided adjacent the abutment portion 146. Again when the two interlocking bushings 124, 128 engage the abutment portion 146 is received in the cooperating cavity 152 of the other bushing.

These various interlocking components, such as the radial abutment portion 140 and the abutment portion 146 extend into the corresponding cavities 142 and 152, assist in interlocking the interlocking bushings 124, 128 relative to one another. This interlocking relationship also allows for a reduction in overall material between the combined two bushings but allows for proper support. This allows both bushings to use the same structures, e.g. both locking projections 140, as support. Additionally, if cavities 142 and 152 were not included, the two bushings 124, 128 would interfere with one another during assembly.

Figure 10:
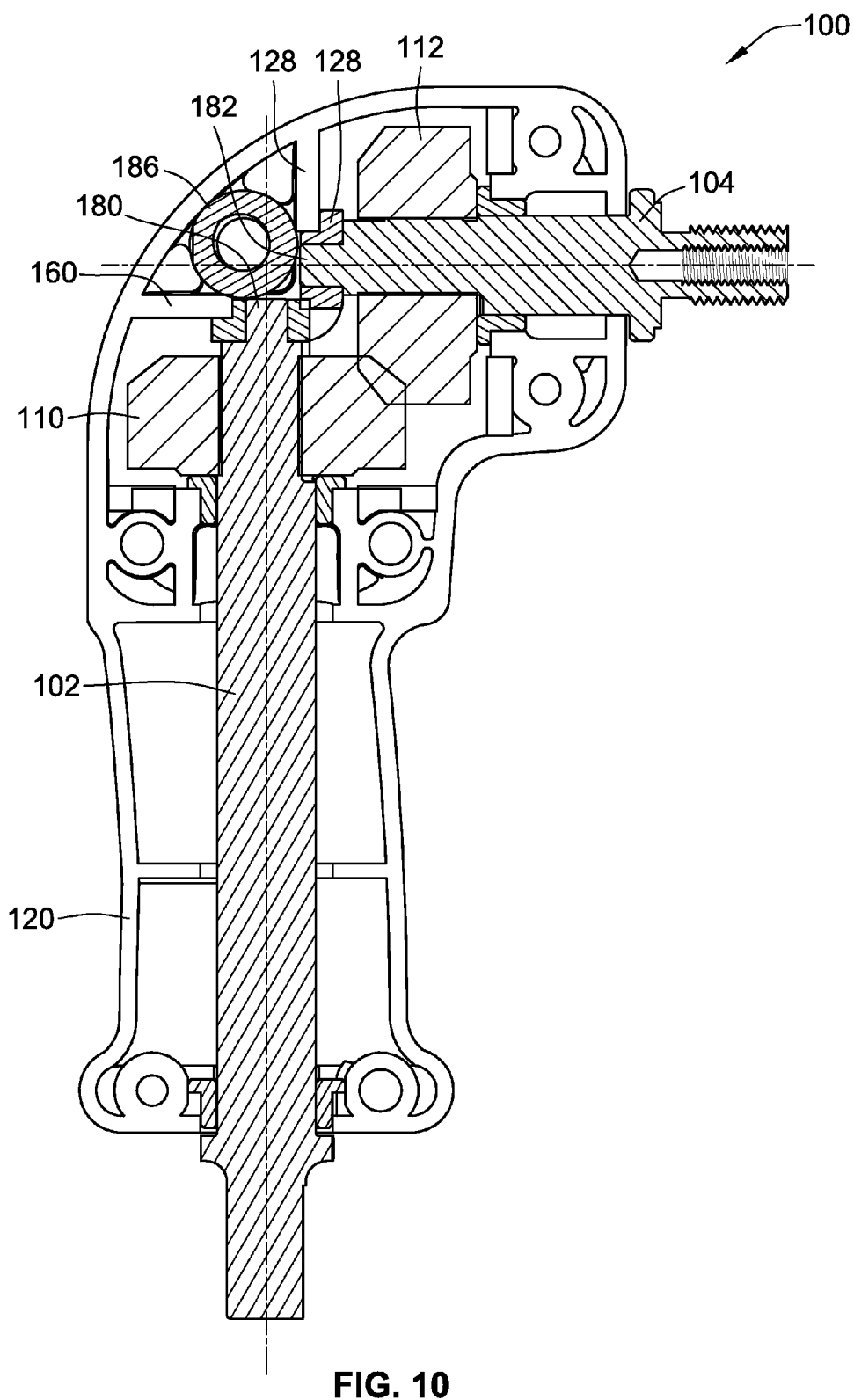
FIG. 10 is a cross-sectional illustration of the right angle drive of FIG. 1.
Figure 11:
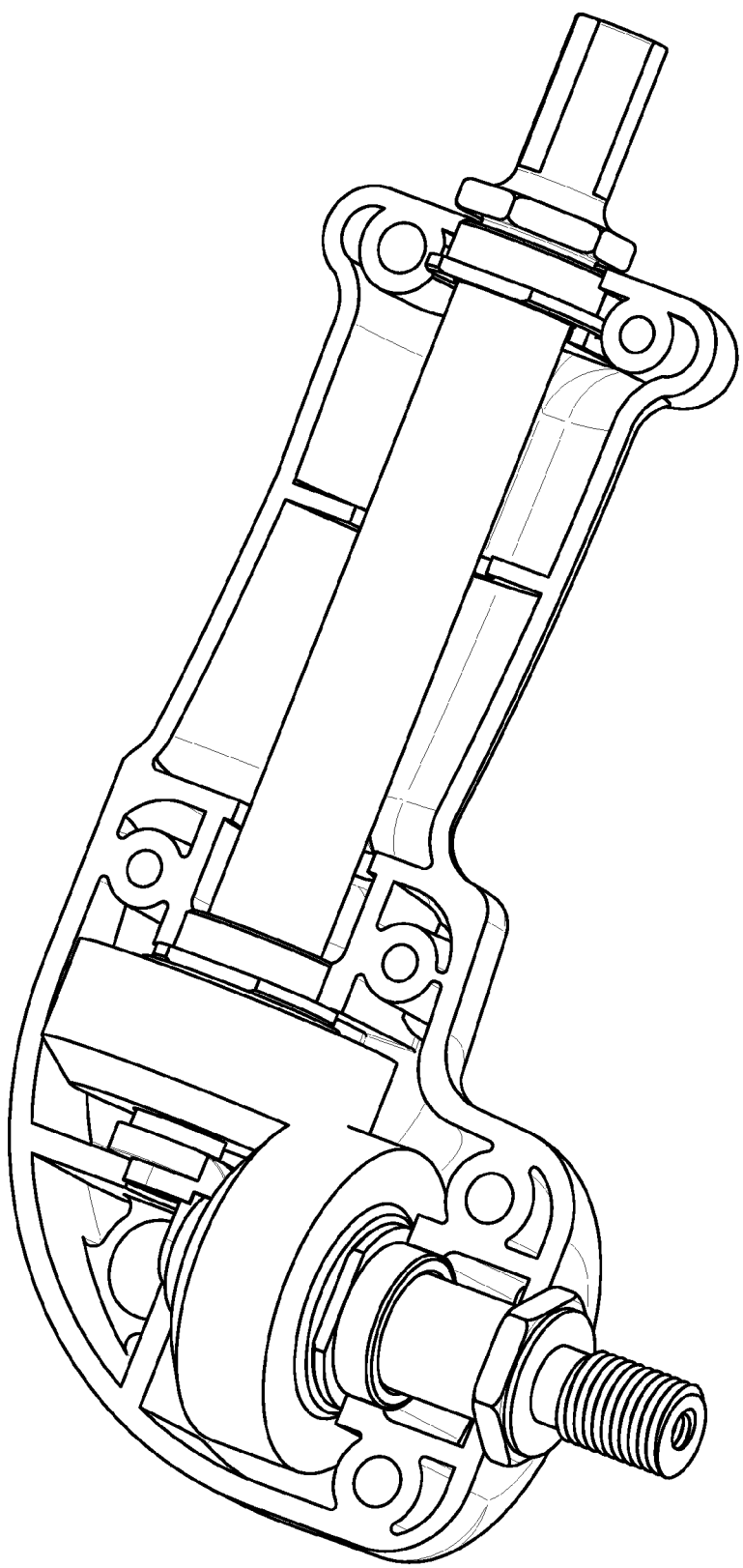
FIG. 11-13 are partial illustrations of the right angle drive attachment of FIG. 1 with various components removed to show the positional relationship of other components.
Figure 12:
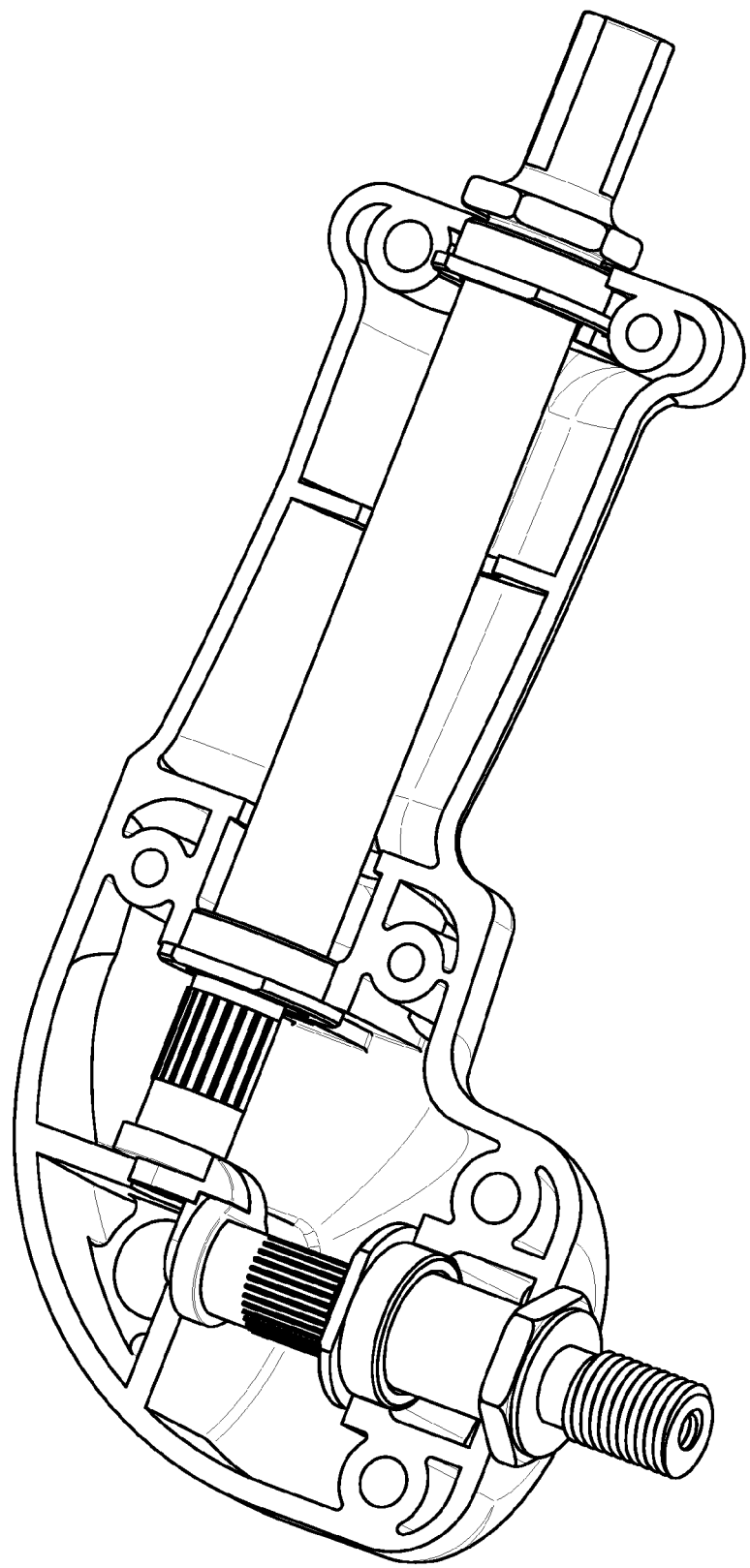
Figure 13:
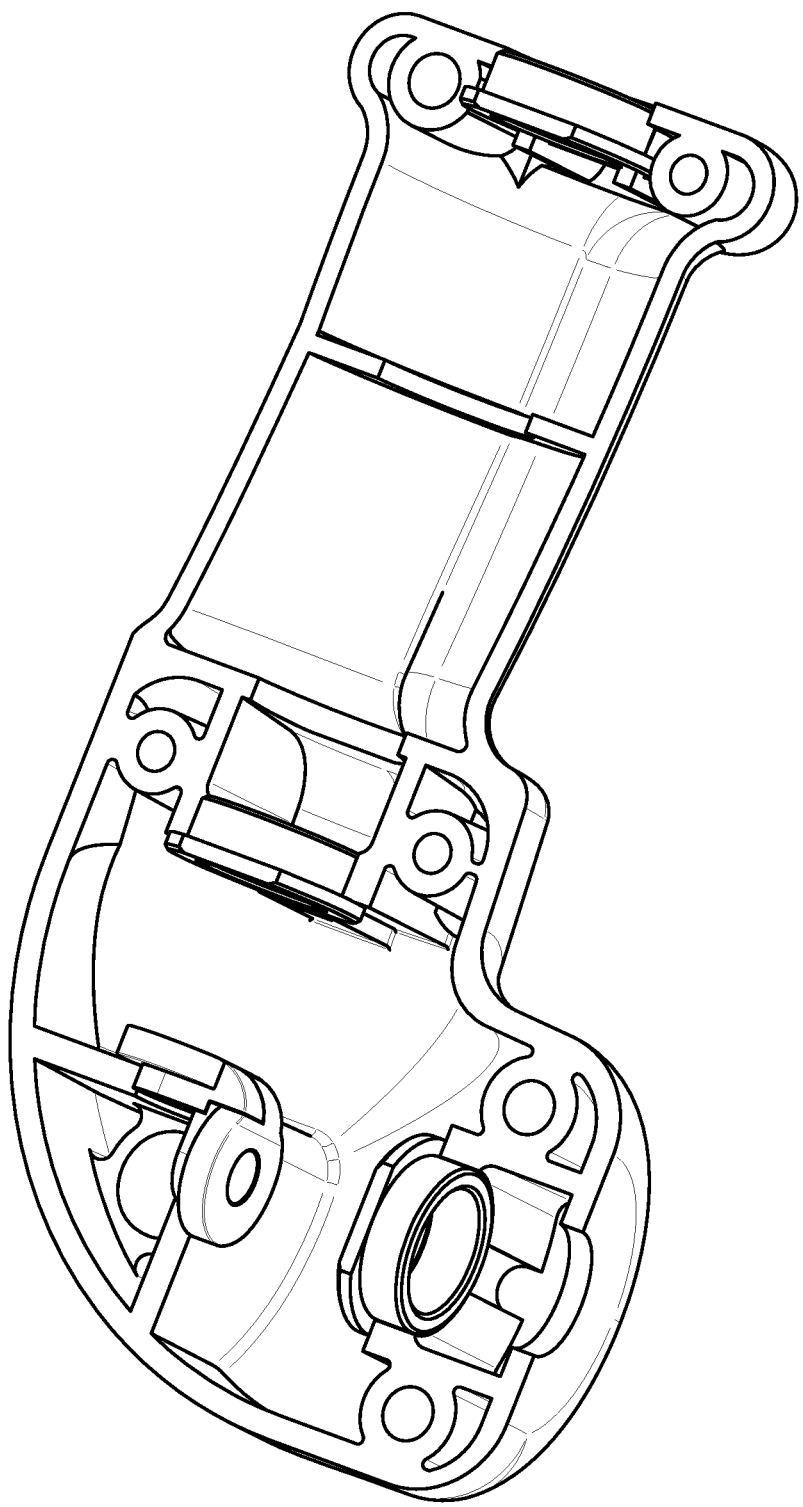

With reference to FIG. 10, the housing 120 includes support walls 160, 162. These support walls 160, 162 support the interlocking bushings 124, 128. More particularly, the abutment projection 132 rests on the support walls 160, 162. Face 134 of the main bodies press axially, in a direction extending away from the corresponding gears 110, 112, against the support walls, 160, 162 to locate the bushings within housing 120. As such, the main body portion is positioned axially between the support walls 160, 162 and the corresponding gears 110, 112. The stepped relationship of the abutment projection 132 relative to main circular body portion 130 of the bushings provides a ledge or shelf for resting on the support walls 160, 162 provided by flats 136, 138 that oppose rotation of the bushings relative to housing 120. In other words, this arrangement provides anti-rotation features to prevent rotation of the bushings relative to housing 120.

The interlocking bushing 124, 128 are typically formed of a sintered metal. However other materials could be used.

Further, it is noted that the input shaft 102 has a stepped profile such that the outboard end has a small diameter portion 180 which is received within the aperture 133 of the interlocking bushing 124. Similarly, the output shaft 104 has a similar reduced diameter portion 182 that is received in the aperture of the interlocking bushing 128. This reduced diameter is typically smaller than the smallest diameter portion of the portion of the shafts that has flats for engaging gears 110, 112.

This interlocking relationship between the interlocking bushings 124, 128 has allowed the use of bushings on the inboard ends of the input and output shafts 102, 104 respectively. This is contemplated to reduce the flexure of the individual shafts 102, 104 so as to reduce the friction generated by the right angle drive. This reduced friction reduces the amount of heat that is generated. The reduction in heat, reduces the ability for the shafts to deform or to deflect the housing material. This increases the rigidity of the housing 120 during operation and prevents or reduces the likelihood of wobble that can render a right angle drive 100 inoperable.

The right angle drive 100 further includes a threaded shaft 186 that can be used to mount a male handle to either side of the right angle drive. The location of the threaded shaft 186 is such that the threaded shaft 186 is directly adjacent support walls 160, 162 to provide additional axial support to those support walls. As such, if the support walls 160, 162 become warm, they will be supported by the threaded shaft 186. This will prevent flexure of those shafts rendering the device more sturdy. See for example FIG. 10.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An angle drive comprising:
   an input shaft carrying an input gear for rotation about an input axis;
   an output shaft carrying an output gear for rotation about an output axis, the input and output gears are coupled transfer rotational motion therebetween, the input axis and output axis being non-parallel to one another;
   a housing;
   an inboard and outboard input shaft bearings carrying the input shaft within the housing for rotation about the input axis, the inboard input shaft bearing supporting the input shaft on an inboard side of the input gear and the outboard input shaft bearing supporting the input shaft on the outboard side of the input gear;
   inboard and outboard output shaft bearings carrying the output shaft within the housing for rotation about the output axis, the inboard output shaft bearing supporting the output shaft on an inboard side of the output gear and the outboard shaft bearing supporting the output shaft on the outboard side of the output gear; and
   the inboard input shaft bearing and inboard output shaft bearing interlocking one another.

2. The angle drive of claim 1, wherein:
   the inboard input shaft bearing includes a radially extending locking projection; and
   the inboard output shaft bearing includes a radially extending locking projection angularly engaging the radially extending locking projection of the inboard input shaft bearing.

3. The angle drive of claim 1, wherein the inboard input shaft bearing includes at least one flat surface that engages a flat of the housing to prevent rotation of the input shaft bearing relative to the housing.

4. The angle drive of claim 1, wherein:
   the inboard input shaft bearing includes a radially extending locking projection that defines an angularly facing abutment surface;
   the inboard output shaft bearing includes a radially extending locking projection that defines an angularly facing abutment surface; and
   the angularly facing abutment surfaces angularly abutting one another to interlock the inboard input and output shaft bearings.

5. The angle drive of claim 4, wherein inboard input shaft bearing includes an aperture axially receiving the input shaft therein, the input axis aligned with a central axis of the aperture, the angularly facing abutment surface of the inboard input shaft bearing being substantially planar defining a first reference plane, the first reference plane including the central axis of the aperture.

6. The angle drive of claim 5, wherein the inboard input and output shaft bearings are identical.

7. The angle drive of claim 4, wherein the inboard input shaft bearing includes a relief cavity adjacent the angularly facing abutment surface and the inboard output shaft bearing includes a relief cavity adjacent the angularly facing abutment surface, the radially extending locking projection of the inboard input shaft bearing positioned within the relief cavity of the inboard output shaft bearing and the radially extending locking projection of the inboard output shaft bearing positioned within the relief cavity of the inboard input shaft bearing.

8. The angle drive of claim 5, wherein the inboard input shaft bearing includes a relief cavity adjacent the angularly facing abutment surface and on an opposite side of the reference plane as the axially extending locking projection thereof and the inboard output shaft bearing includes a relief cavity adjacent the angularly facing abutment surface, the radially extending locking projection of the inboard input shaft bearing positioned within the relief cavity of the inboard output shaft bearing and the radially extending locking projection of the inboard output shaft bearing positioned within the relief cavity of the inboard input shaft bearing.

9. The angle drive of claim 4, wherein the inboard input shaft bearing includes an aperture axially receiving the input shaft therein, the input axis aligned with a central axis of the aperture, the axially extending locking projection of the inboard input shaft bearing defines an axially facing abutment surface that is substantially orthogonal to the central axis of the aperture, the inboard output shaft bearing includes a radially facing abutment surface, the axially facing abutment surface of the inboard input shaft bearing abutting the radially facing abutment surface of the inboard output shaft bearing.

10. The angle drive of claim 4, wherein:
the inboard input shaft bearing includes:
an aperture axially receiving the input shaft therein, the input axis aligned with a central axis of the aperture;
the radially extending locking projection of the inboard input shaft bearing defines an axially facing abutment surface that is substantially orthogonal to the central axis of the aperture;
a radially facing abutment surface; and
the inboard output shaft bearing includes:
an aperture axially receiving the output shaft therein, the output axis aligned with a central axis of the aperture,
the radially extending locking projection of the inboard output shaft bearing defines an axially facing abutment surface that is substantially orthogonal to the central axis of the aperture;
a radially facing abutment surface;
the axially facing abutment surface of the inboard input shaft bearing abutting the radially facing abutment surface of the inboard output shaft bearing; and
the axially facing abutment surface of the inboard output shaft bearing abutting the radially facing abutment surface of the inboard input shaft bearing.

11. The angle drive of claim 4, wherein the inboard input shaft bearing includes a main body portion and an abutment projection extending axially outward from the main body portion in a stepped relationship, the abutment projection defining at least one anti-rotation feature;
the housing including a first support wall including an anti-rotation feature that cooperates with the anti-rotation feature of the abutment projection to prevent rotation of the inboard input shaft bearing relative to the housing;
the inboard input shaft bearing including an aperture axially receiving the input shaft therein;
the main body portion axially abutting the first support wall in a direction extending generally along the input axis;
the anti-rotation features of the abutment projection and the first support wall cooperate in a direction extending generally perpendicular to the input axis.

12. The angle drive of claim 11, wherein the anti-rotation features are flats.

13. The angle drive of claim 11, wherein the main body portion is positioned axially between the first support wall and the input gear.

14. The angle drive of claim 1, wherein the inboard input shaft bearing and the inboard output shaft bearing are bushings.

15. The angle drive of claim 3, wherein:
the inboard input shaft bearing includes a radially extending locking projection; and
the inboard output shaft bearing includes a radially extending locking projection angularly engaging the radially extending locking projection of the inboard input shaft bearing.

16. The angle drive of claim 1, wherein:
the inboard input shaft bearing includes a radially extending locking projection that defines an angularly facing abutment;
the inboard output shaft bearing includes a radially extending locking projection that defines an angularly facing abutment; and
the angularly facing abutments angularly abutting one another to interlock the inboard input and output shaft bearings.

17. The angle drive of claim 16, wherein the inboard input shaft bearing includes a relief cavity adjacent the angularly facing abutment and the inboard output shaft bearing includes a relief cavity adjacent the angularly facing abutment, the radially extending locking projection of the inboard input shaft bearing positioned within the relief cavity of the inboard output shaft bearing and the radially extending locking projection of the inboard output shaft bearing positioned within the relief cavity of the inboard input shaft bearing.

18. The angle drive of claim 16, wherein the inboard input shaft bearing includes an aperture axially receiving the input shaft therein, the input axis aligned with a central axis of the aperture, the axially extending locking projection of the inboard input shaft bearing defines an axially facing abutment that is substantially orthogonal to the central axis of the aperture, the inboard output shaft bearing includes a radially facing abutment, the axially facing abutment of the inboard input shaft bearing abutting the radially facing abutment of the inboard output shaft bearing.

19. The angle drive of claim 16, wherein:
the inboard input shaft bearing includes
an aperture axially receiving the input shaft therein, the input axis aligned with a central axis of the aperture;
the radially extending locking projection of the inboard input shaft bearing defines an axially facing abutment;
a radially facing abutment; and
the inboard output shaft bearing includes:
an aperture axially receiving the output shaft therein, the output axis aligned with a central axis of the aperture,
the radially extending locking projection of the inboard output shaft bearing defines an axially facing abutment;
a radially facing abutment;
the axially facing abutment of the inboard input shaft bearing abutting the radially facing abutment of the inboard output shaft bearing; and
the axially facing abutment of the inboard output shaft bearing abutting the radially facing abutment of the inboard input shaft bearing.

* * * * *